(No Model.)
W. W. GRISCOM.
SWITCH OR CIRCUIT CHANGER.
No. 394,568. Patented Dec. 18, 1888.
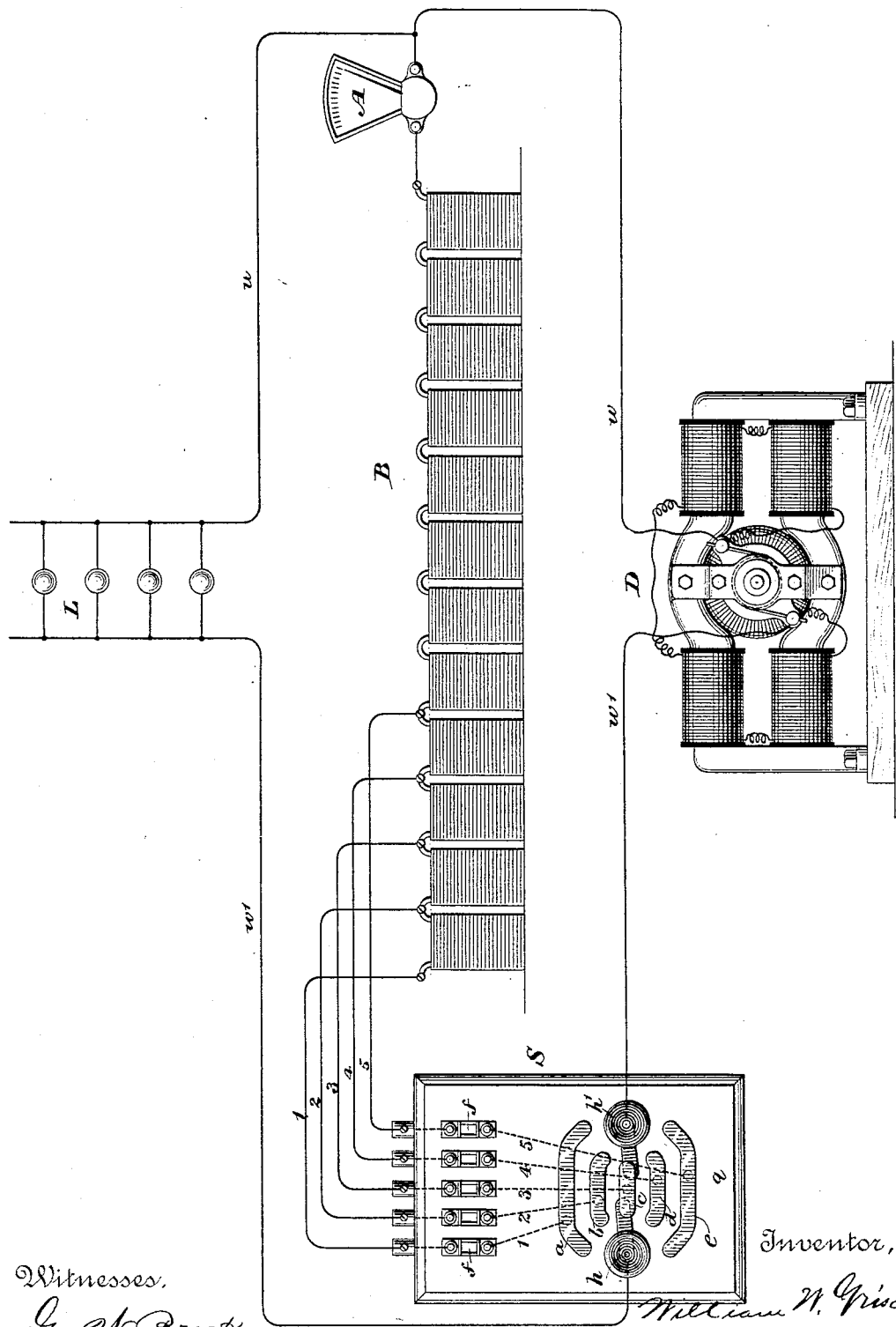

UNITED STATES PATENT OFFICE.

WILLIAM W. GRISCOM, OF HAVERFORD COLLEGE, ASSIGNOR TO THE ELECTRO-DYNAMIC COMPANY OF PHILADELPHIA, PENNSYLVANIA.

SWITCH OR CIRCUIT-CHANGER.

SPECIFICATION forming part of Letters Patent No. 394,568, dated December 18, 1888.

Application filed October 24, 1888. Serial No. 289,039. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Switches or Circuit-Changers, of which the following is a specification.

My invention is an improvement in switches or circuit-changers.

It consists of a double regulating-switch composed of a series of bars of varying lengths, the terminals of which are arranged in the arc of a circle. A rotating radial arm is pivoted at the center of the circle of which the bar-terminals form an arc, and may thus be placed in contact with the terminal of any bar. This arrangement of switch is specially applicable to use in connection with an isolated electric-light plant employing accumulators or storage-batteries, and when inserted between the battery and main conductor renders it possible to charge any portion of the battery while the same or a different portion is in the working-circuit.

The accompanying drawing illustrates my invention.

D is a dynamo-electric machine. Conductors $w$ $w'$ lead from the dynamo to the location of a series of translating devices, as lamps L, in multiple arc. Between the dynamo and lamps the terminals of a secondary battery, B, are connected to the conductors $w$ and $w'$, respectively. Between the conductor $w$ and one terminal of the battery an ammeter, A, is inserted, and the connection between conductor $w$ and battery at that point is substantially permanent. At the corresponding point in the other conductor a switch, S, is included, whereby the number of cells of battery included in circuit with the dynamo and the number of cells in circuit with the lamps may be independently varied and regulated. This switch is of an improved form and arrangement, and consists of a series of bars of conducting material, as brass or copper, $a$ $b$ $c$ $d$ $e$. The opposite terminals or ends of these bars are arranged in the arc of a circle—that is, the corresponding ends of these bars on one side of the base-board $q$ form the arc of a circle, and the opposite corresponding ends of said bars on the opposite edge of said base-board form a similar arc. Pivoted at the center of each circle of which these bar-terminals form an arc is a rotating radial arm, $h$ or $h'$, the free end of which makes contact successively with the bar-terminals of its own arc. The main conductor $w'$ is divided, one terminal being connected to arm $h$, the other to $h'$. A series of tap-wires, 1 to 5, connect the terminals of a series of cells of the battery B, respectively, with the series of bars $a$ $b$ $c$ $d$ $e$, respectively, cells nearest the end of the battery being preferably selected for this purpose. In each tap-wire, 1 to 5, I place an easily-fusible section of conducting material, $f$.

In the arrangement shown, two arms, $h$ $h'$, normally rest upon the bar $c$, and the dynamo supplies the lamps while the two end cells of battery are out of circuit, the remainder acting to absorb electric energy and regulate the current supplied to the lamps. If, now, we place arm $h'$ on bar $a$, circuit will be from dynamo via elements $w'$ $h'$ $a$ 1 to the terminals of battery B, and the entire battery will be in circuit with the dynamo. Circuit from the battery B is still the same, however, via elements 3 $c$ $h$ $w'$ to lamps. The entire battery is being charged and a portion only discharged. We may, however, rotate arm $h$ to bar $a$, and thus include the entire battery in both circuits, or we may move either arm, $h$ or $h'$, to vary the number of cells in either circuit.

The special arrangement of switch is of extraordinary advantage in this connection, as, among other reasons, it is possible to see at a glance just what the conditions are, and the liability to sparking and short-circuiting is entirely eliminated.

What I claim, and desire to secure by Letters Patent, is—

1. The combination, in a switch or circuit-changer, of a series of metallic bars, the opposite ends of which are arranged in position to form arcs of two separate circles, respectively, and a rotating radial arm pivoted at the center of each circle, the free end making contact successively with the bar-terminals of its circle at the center of which said arm is pivoted.

2. The combination of a dynamo-electric machine, a series of translating devices, as lamps, connected thereto by an electrical circuit, a secondary battery, and a switch or circuit-changer consisting of a series of bars or conductors, the opposite ends of which are arranged in position to form arcs of two separate circles, respectively, rotating radial arms forming the terminals of the divided circuit pivoted at the center of each circle, their free ends making contact successively with the terminals of the circles at the center of which said arms are pivoted, and an electrical connection from each bar or conductor to a separate point in the series of battery-cells.

WILLIAM W. GRISCOM.

Witnesses:
DANIEL E. DELAVAN,
WM. B. VANSIZE.